W. B. SMITH.
Gates.
No. 133,807. Patented Dec. 10, 1872.
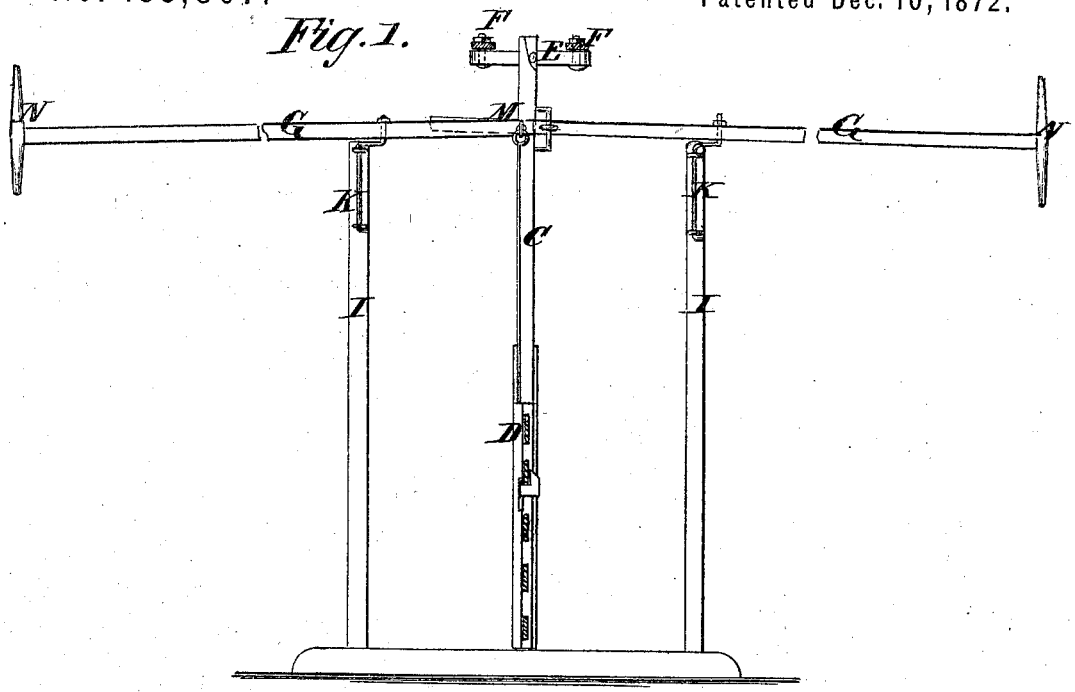
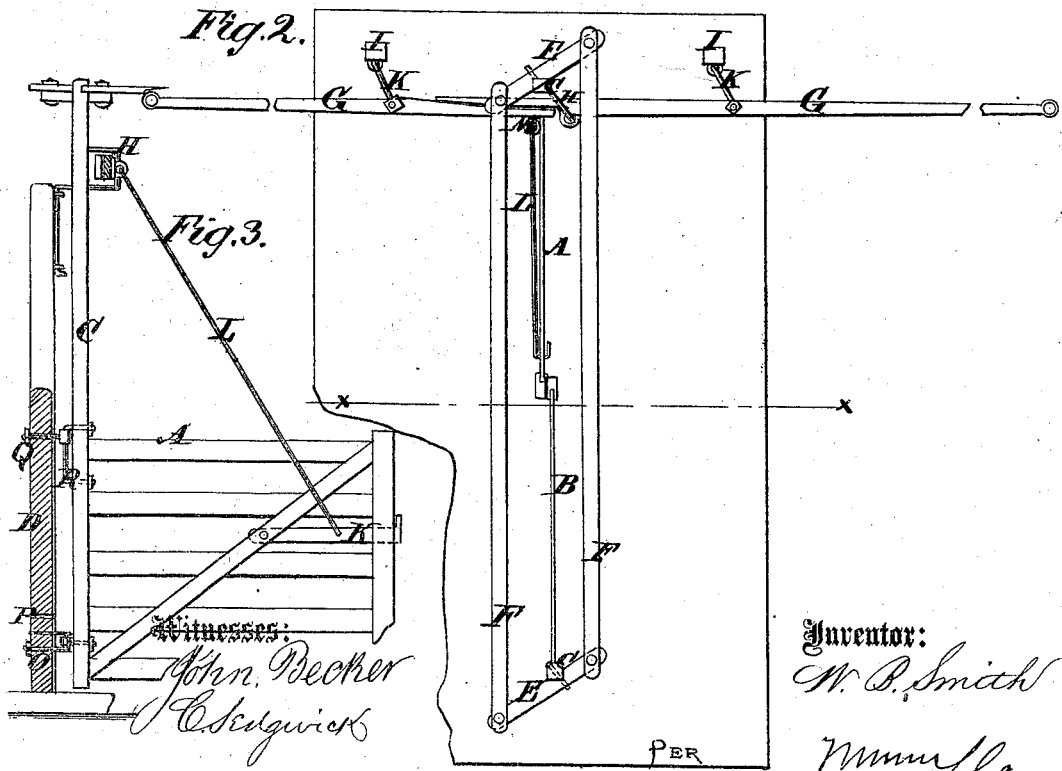

UNITED STATES PATENT OFFICE.

WILLIAM B. SMITH, OF COPPER CREEK, ILLINOIS.

IMPROVEMENT IN GATES.

Specification forming part of Letters Patent No. 133,807, dated December 10, 1872.

*To all whom it may concern:*

Be it known that I, WILLIAM B. SMITH, of Copper Creek, in the county of Rock Island and State of Illinois, have invented a new and useful Improvement in Gates, of which the following is a specification:

The invention relates to means for opening double gates; and consists in those hereinafter fully described and subsequently pointed out in claim.

Figure 1 is a transverse section of my improved gate taken on the line $x$ $x$ of Fig. 2, the gates being shut. Fig. 2 is a plan view, and Fig. 3 is a sectional elevation taken in a line perpendicular to that of Fig. 1.

Similar letters of reference indicate corresponding parts.

A and B represent the two gates, which have high posts C, by which they are hinged to the permanent posts D for being coupled overhead by the cross-bars E and parallel bars F, so that one gate will be opened and closed by the other, the said gates swinging in opposite directions. G represents the long rods attached to one of the gates, and extending each way along the road, for opening and closing the gates without dismounting. They are connected to one of the posts C by a short crank, H, and at a suitable distance therefrom mounted on a post, I, by a crank, K, which supports them horizontally and allows them to move longitudinally sufficiently for operating the gates. They are also so mounted on these cranks as to swing vertically sufficiently to latch and unlatch the gates, to the latch K of which they are connected by a rod, L, at a point, M, where the two rods are pivoted together, so as to rise and fall sufficiently to actuate the latch, which fastens the gates by moving upward and unfastens them by moving downward. The said rods, being longest and heaviest at the outer sides of their pivots K, hold the latch up and keep the gate fastened. They are lifted up when taken hold of to operate the gates for unlatching them. The rods are provided at the outer end with a vertical handle, N, extending downward to be within reach of one on the ground, and upward to be reached by one on a load. The lower hinge of the gate is movable up and down the post for shifting the gate higher or lower by the withdrawing the staple O from one of the holes P and putting it in another; but the staple Q of the upper hinge, being connected to a long staple, R, on the gate, allows the gate to slide up and down freely as much as required, so that the gate may be readily raised in winter above the snow and let down again when the snow is gone.

By having the gates coupled together in this manner, so arranged (as to the coupling devices) as to swing in opposite directions, one balances the other when the wind blows, so that a material advantage is gained in the coupling of them, merely, whether the attachment for operating them without dismounting be employed or not.

Having thus described my invention, I claim as new and desire to secure by Letters Patent—

The means described, by which two gates standing in the same plane may be simultaneously swung open by hand, consisting of the posts C C, bars E F, posts I I, cranks K K, rod L, and bars G G, arranged as set forth.

WILLIAM BASSETT SMITH.

Witnesses:
JOSIAH WHALEY,
PERRY WHALEY.